Figure 1:
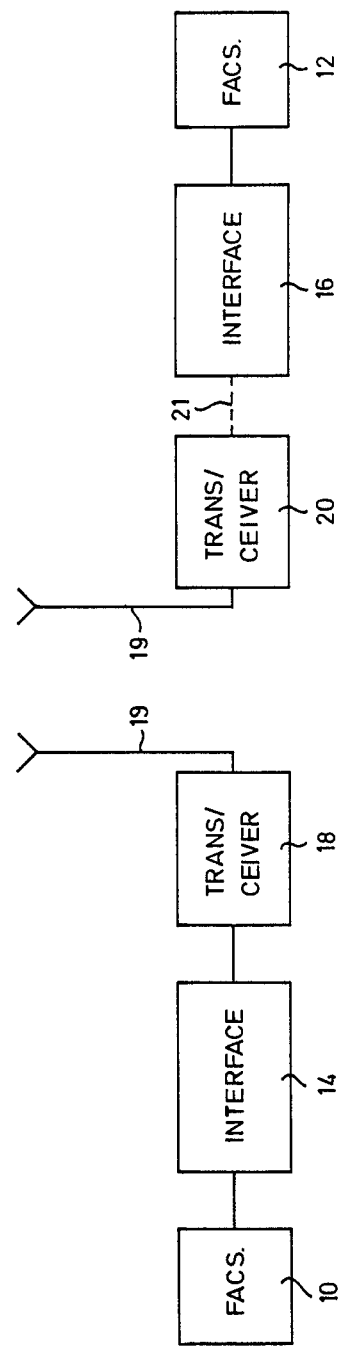

United States Patent [19]

Polansky et al.

[11] Patent Number: 4,809,297
[45] Date of Patent: Feb. 28, 1989

[54] INTERFACE DEVICE

[75] Inventors: Ken Polansky, Fort Saskatchewan; Gerry Polanski, Bon Accord; Lee Bush, Edmonton, all of Canada

[73] Assignees: Williams Electronics Ltd., Edmonton; Polansky Electronics Ltd., Fort Saskatchewan, both of Canada

[21] Appl. No.: 657,730

[22] Filed: Oct. 4, 1984

[51] Int. Cl.$^4$ .............................................. H04N 1/42
[52] U.S. Cl. .......................................... 375/7; 358/256; 375/121; 455/73; 455/79; 455/88
[58] Field of Search ................ 375/7, 8, 121; 455/73, 455/78, 79, 83, 88, 89, 90; 178/66.1, 3, 1, 2 A; 358/256, 257, 286; 179/2 C, 2 DP; 379/56, 63, 90, 93, 94, 100

[56] References Cited

U.S. PATENT DOCUMENTS

| | | | |
|---|---|---|---|
| 2,599,904 | 6/1952 | Evans | 358/256 |
| 3,441,665 | 4/1969 | Wuensch | 358/257 |
| 3,592,962 | 7/1971 | Matthews et al. | 358/256 |
| 3,609,241 | 8/1971 | Riethmeier | 358/256 |
| 3,739,338 | 6/1973 | Jacobson et al. | 375/7 |
| 3,783,194 | 1/1974 | Vilips | 375/8 |
| 4,130,840 | 12/1978 | Vandling | 178/66.1 |
| 4,199,809 | 4/1980 | Pasahow | 371/37 |
| 4,227,045 | 10/1980 | Chelcun | 178/66.1 |
| 4,384,356 | 5/1983 | Beerbaum | 375/8 |
| 4,422,098 | 12/1983 | Logie | 358/286 |
| 4,425,663 | 1/1984 | Lam | 375/7 |
| 4,490,746 | 12/1984 | Moriguchi | 358/257 |

Primary Examiner—Benedict V. Safourek
Attorney, Agent, or Firm—Thomas A. O'Rourke

[57] ABSTRACT

An interface device for connection between a facsimile reproduction machine and a simplex radio includes a receiving circuit and a transmitting circuit. A switch connects an appropriate one of the circuits to the machine. A control circuit monitors the change in the mode of operation of the machine and operates upon the switch to cause a corresponding change of connection to the machine. The control circuit also operates upon the transceiver to condition it to a transmit mode upon the transmit circuit being selected.

9 Claims, 2 Drawing Sheets

INTERFACE DEVICE

The present invention relates to interfaces to permit transmission of signals between a data transfer unit and a radio transceiver and finds particular utility although is not exclusively intended for use with a facsimile reproduction unit.

The transmission of data through telephone land lines is of course well known. In areas where such land lines do not exist or where distances are very great, radio telephones are utilised to establish communication between distant locations. Radio telephones may be of two basic configurations either simplex or duplex with simplex transmission being the most common. With simplex transmission both transmission and reception of signals is performed on a single frequency width so that transmission must cease before reception can commence. With a duplex transmission two frequencies are used so that the simultaneous reception and transmission is available.

Whilst simplex transmission has been widely accepted and has proved invaluable to establish communications to distant areas, it has not been possible to utilise certain types of data processing equipment with a simplex unit. There is, for example, a need to transmit data such as well logging data between an oil rig and the head office of the drilling company. Such data can be transmitted by land lines through the use of facsimile copiers. Transmission of facsimile copies can also be achieved over a simplex line provided that the analogue facsimile copiers commonly categorized as Group 1 and Group II machines are utilised. However, the Group 1 and Group II machines have a transmission rate of between 3 and 6 minutes per page and have rapidly been superceded by the high speed digital machines that are commonly categorised as Group III machines. The use of Group III machines has not been possible with a simplex radio transceiver because of the ability to accommodate the initial "handshaking" protocol is not available. The handshaking technique requires the exchange of data packets between the two facsimile machines and so requires two-way transmission in a coordinated manner. Such two-way transmission is not available with a conventional simplex transceiver and so it has been necessary to retain the older Group 1 and II machines where the only means of communication is by way of simplex radio transmitters. This has, of course, increased the transmission time and therefore the cost of the data.

It is therefore an object of the present invention to provide an interface device that permits the connection of a data processing machine with a radio transceiver so as to permit the orderly exchange of data between a pair of data processing units through the transceiver.

According therefore to the present invention there is provided an interface to connect a data transfer device with a radio transceiver comprising a receiving circuit to receive a data signal from said transceiver, a transmitting circuit to transmit a data signal to said transceiver, a data bus to transfer data between said device and said circuits, switch means to connect one of said circuits with said data bus and control means to control said switch means, said control means being responsive to a change in the operational mode of said data transfer device to disconnect said one circuit and connect the other of said circuits to said data bus.

Figure 2:
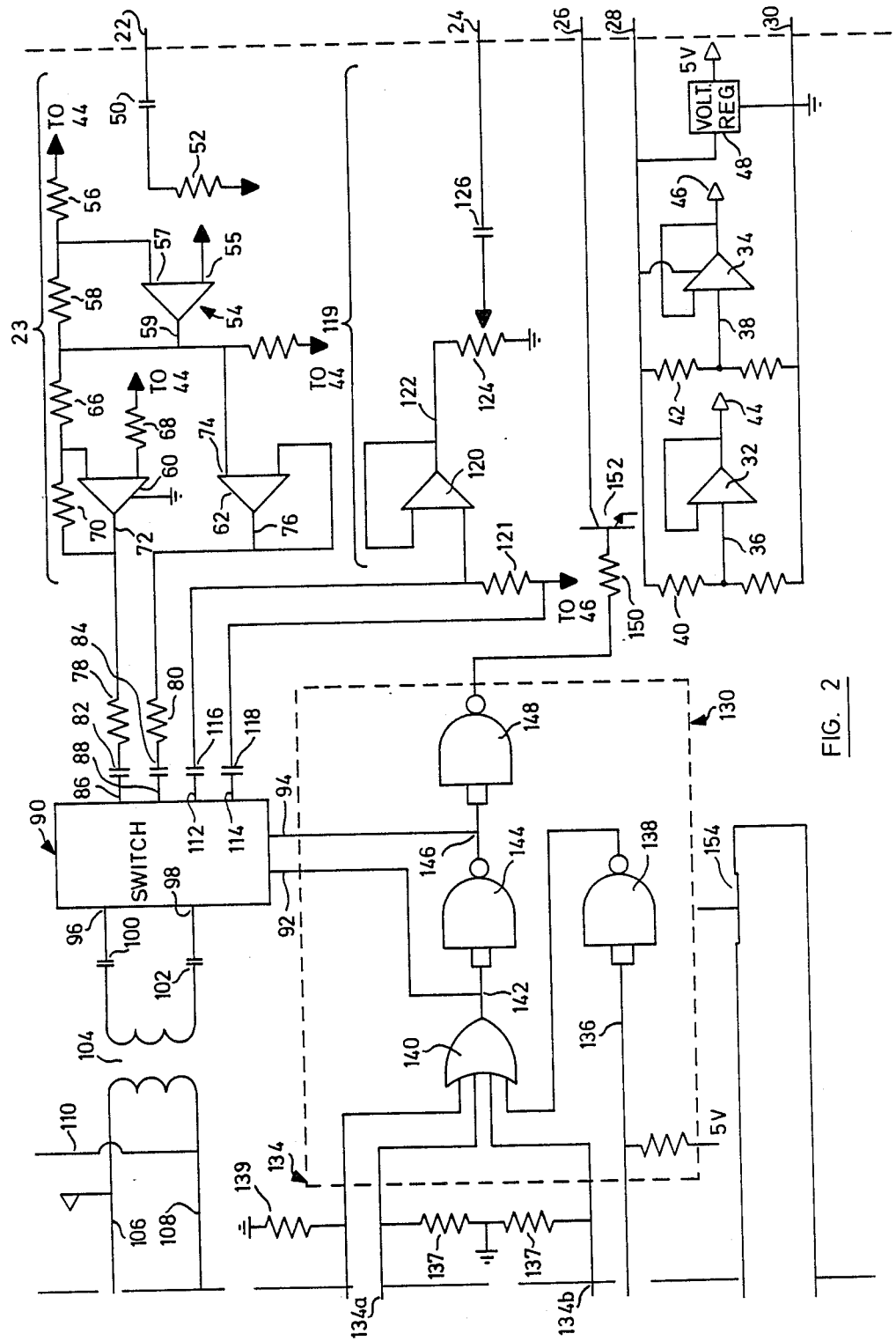

An embodiment of the invention will now be described by way of example only with reference to the accompanying drawings in which FIG. 1 is a schematic diagram of a data transmission link utilising a simplex transceiver system;

FIG. 2 is a circuit diagram showing the schematic operation of interface unit illustrated in FIG. 1.

Referring now to FIG. 1, a pair of data transfer devices in the form of facsimile machines 10, 12 are connected through respective interface devices 14, 16 to transceiver units 18, 20. The transceiver units are of the conventional analog type and are connected to respective antenna 19 which transmit and receive analog signals to and from respective transceivers. As indicated by the dotted lines 21 the transceivers may be connected to the interfaces through land lines although at least one part of the communication between the two facsimile machines 10, 12 is by way of the radio link between the antennas 19.

The transceivers 18, 20 are conventional simplex transceivers of any convenient type. These may be amplitude modulated or frequency modulated as desired.

The facsimile reproducers 10, 12 are Group III machines that transmit data through a digital signal processing technique, typical models being the Xerox 295 and the Pitney Bowes 8100. This technique involves digitizing the presented data and then converting the digitized data to analog form for transmission. In order to establish connection between the machines 10 and 12 it is necessary for the machines 10, 12 to exchange data to ensure that the machines are compatible and are receiving data at the same rate as it is being transmitted. This is normally conducted through land lines in which case a sequential transfer data between the two machines is possible. However, with transceivers 18 and 20 being of a simplex format, it is necessary for the transceivers to be conditioned to transmit and subsequently conditioned to receive so that the orderly exchange of data between the two machines is not possible. Accordingly, the interface devices 14, 16 are used to control the transceivers 18, 20 to permit the orderly exchange of data between the two facsimile machines 10, 12. The interface devices 14, 16 are identical and thus only one will be described in detail.

The operation and organization of the interface device 14, 16 may best be seen in FIG. 2. The interface 14 is connected to the transceiver 18 through a multiple lead cable including a receiving lead 22, a transmitting lead 24, and a transmission setting line 26 commonly referred to as "push to talk" or "P.T.T." line. The cable also provides a power supply formed through leads 28 and 30 that taps the power supply of the transceiver 18 to supply a 13.5 volt source for the interface 14. The 13.5 volt source is stepped down by a pair of operational amplifiers 32, 34 respectively whose inputs 36, 38 are connected to nodes of a voltage dividing circuit provided by resistors 40, 42 connected between the lines 28, 30. The outputs 44, 46 of the amplifiers 32, 34 respectively provide a DC voltage for the balance of the operational amplifiers in the circuit as will be described below. Also connected between the lines 28, 30 is a mono-stable voltage regulator 48 that provides a controlled five volt supply for the integrated circuit components used in the balance of the circuit.

The receiving line 22 is connected to a receiving circuit indicated by bracket 23 through an isolating capacitor 50 and a level setting resistor 52 to one input 55 of an operational amplifier 54. The other input 57 of the amplifier 54 is derived from the output of the power supply operational amplifier 32 through a resistor 56. A feedback resistor 58 is connected between the input 57 and output 59 of the operational amplifier 54 to provide a 40 DB gain across the operational amplifier 54.

The output 59 of the operational amplifier 54 is supplied to a pair of operational amplifiers 60, 62 and connected to the operational amplifier 32 through a resistor 61. One of the inputs 64 of the amplifier 60 is derived from the output 59 after passing through a resistor 66. The other input 68 of the amplifier 60 is supplied from the output of operational amplifier 32 through a resistor 68. A feedback resistor 70 is connected between the output 72 and input 64 of the amplifier 60 so that the operational amplifier 60 provides a unit gain but inverts the signal.

The output 59 of amplifier 54 is also fed to one input 74 of the amplifier 62 with the other input being derived directly from its output 76. The amplifier 62 thus provides a non-inverted unit gain so that the outputs 72 and 76 of respective amplifiers 60, 62 are of equal but opposite magnitude. The outputs 72, 76 are connected through resistors 78, 80 respectively and isolation capacitors 82, 84 to inputs 86, 88 of a switching device 90.

Switching device 90 can be conditioned by control inputs 92, 94 to connect the input 86 with output 96 and input 88 with output 98. The outputs 96, 98 are connected through isolating capacitors 100, 102 to one side of an impedance matching transformer 104. The opposite side of the transformer 104 is connected to lines 106, 108 that provide a databus for the transmission of data to and from the facsimile machines 10, 12. Connected in parallel with the lines 106, 108 is a land line jack 110 that permits the connection of the interface directly to a land line jack if such is available. The jack 110 which is a commercially available unit also disconnects the bus from the transformer when connected to the land line.

The switching device 90 is also operable through the control lines 92, 94 to connect the ports 96, 98 with outputs 112, 114. The outputs 112, 114 are respectively connected through isolating capacitors 116, 118 to transmitting circuit 119. The outputs 112, 114 are connected across a resistor 121. The output 114 is also connected directly to the output of the power supply operational amplifier 34 and the output 112 is connected to the input of an operational amplifier 122 whose other input is directly connected to its output 122. The amplifier 120 therefore operates as a voltage follower to provide an isolating amplifier with unit gain. The output 122 is connected through a level setting resistor 124 and isolating capacitor 126 to the transmission line 124 of the transceiver.

The signals in control lines 92, 94 are derived from a control circuit generally designated 130 that is connected to the facsimile machine 10 or 12. Input to the control circuit 130 is provided by a cable 132 having three signal lines 134 and a signal line 136. The signal lines 134 are provided to connect the interface 14 with a facsimile machine that has a control point that changes from "low" to "high" as the machine switches from a receive to a transmit mode. A plurality of lines 134 are provided to match the internal characteristics of different facsimile machines and thereby increase the versatility of the interface. It is also necessary to provide a plurality of lines for some machines as their internal connections vary as their speed of operation changes. To this end, two of the leads 134a, 134b are connected to ground by resistors 137 and the other one is connected to ground through resistor 139. The line 136 is provided for connection to a machine that operates inversely, that is goes from a high to a low condition upon switching from a receive to a transmit mode and is connected to the 5 V supply 48 through a resistor 141. The location of the control point in the facsimile machine will vary for different types of machine but it has been found that each make of machine does have a suitable location in its control circuits for connection.

The line 136 is connected through a NAND gate 138 to invert the signal on line 136 and supply it to an input of an OR gate 140. The lines 134 are also connected to the OR gate 140 whose output 142 is connected to the control line 92. The output 142 is also connected to the input of a NAND gate 144 whose output is connected to the control line 94. The output 146 also provides an input to a second NAND gate 148 that is connected through a resistor 150 to the gate input of a transistor 152 that is connected between ground and the control line 26. Turning on of the transistor 152 engages the radio "push to transmit" (PTT) circuit to turn the transmitter on.

The normally closed switching circuit 154 is also provided for those machines that utilise the hand set of the transceiver as a switching device.

The operation of the system will now be described assuming that both of the facsimile reproduction means are initially idle. In the idle condition the inputs to OR gate 140 in each of the interfaces 14, 16 are low so that a low signal is provided at the output 142 thus a low signal appears at the control line 92. The low output of the OR gate 142 is inverted by the NAND gate 144 so that a high signal appears at the control line 94. With a low signal on the control line 92 and a high signal on the control line 94 the switching device 90 is conditioned to connect the input 86 with the port 96 and the input 88 with the port 98. As the output of NAND gate 144 is high, the output of NAND gate 148 will be low so that the transistor 152 is switched off and the PTT circuit is disabled. In this condition the databus provided by lines 106, 108 is connected through the receiving circuit 23 to the reception line 22 and both interfaces are conditioned to receive data that is provided at the demodulated output of the transceiver 18.

When it is desired to transmit data from the facsimile machine 10 to the facsimile machine 12 the original is first loaded on the machine in a conventional manner and the machine is switched to transmit. Before transmission of the document can occur it is necessary to establish whether the machine 12 is compatible with the machine 10 and to establish identical rates of transmission and reception. Upon being instructed to transmit data the machine 10 initiates a handshaking procedure that requires the exchange of information between the machine 10 and the machine 12. Initially the machine 10 will transmit a packet of data and upon the machine 10 commencing transmission the control point to which the cable 132 is connected will change state. Thus the input to OR gate 140 of interface 14 changes from a low to a high condition causing the output 142 to also change from low to high. Similarly the output 146 changes from high to low that the control signals on lines 92 and 94 are now high and low respectively. With this input signal, the switching device 90 connects the port 96 with the port 112 and the port 98 with the port 114. The lines 106, 108 are thus connected through the matching transformer 104 with the transmitting line 24 of the transceiver through the operational amplifier 120.

Further the change in output of NAND gate 148 changes from low to high and switches on transistor 152 to pull the PTT line 26 low and condition the transceiver 18 to a transmit mode. The switching device 90 thus disconnects the receiving circuit connected to line 22 and connects the databus from the facsimile machine 10 to the transmission line 24 of transceiver 18. No change of state has been detected by interface 16 and so the transceiver is still connected to the machine 12 through receiving circuit 23 of interface 14.

The packetted data is first converted from digital to analog form and then transmitted through the transceiver 18 and antennae 19 to the transceiver 20 and to the interface 16 and associated with the facsimile machine 12. The machine 12 receives a demodulated analog data packet on its input line 22 which is amplified by the operational amplifier 54 and supplied as a push-pull signal to the inputs 86, 88 of switching device 90. The control signals on the lines 92, 94 are low and high respectively as the machine 12 is in a receiving condition rather than a transmitting condition. Thus the inputs 86, 88 are connected to the ports 96, 98 respectively and analog data is transmitted through the transformer 104 to the machine 12. Once the initial data packet has been transmitted by the facsimile machine 10, the machine switches from a transmit to a receive mode causing the input to the OR gate 140 of interface 14 to go low. This once again causes the control signals 92, 94 to switch to low and high respectively causing the inputs 86, 88 to be connected to the ports 96, 98 respectively. Thus the fax machine is again in a condition to receive the analog data packet from the fax machine 12 so that the handshaking protocol can continue.

As the machine 12 receives the initial data packet it transmits a further packet of data from the machine 12. This causes the input to the OR gate 140 of interface 16 to switch from a low to a high condition so that the output of the machine 12 is now connected through the switching 90 to the transmitting line 24 of the transceiver 22. The transmission of data by the fax 12 is only initiated after the reception of the full packet of data from the fax 10 as is conventional with the handshaking protocol. Once the machines have synchronized by the exchange of data packets in the manner described above, the machine 10 will commence to transmit data to the line 24 of transceiver 18 that is received at the line 22 of transceiver 20.

Once the transmission has been completed the fax machine 10 again reverts to the receive mode ready to either initiate a further transmission of data or to receive data from another machine.

It will be seen that the with above device the switch 90 effectively permits the exchange of the data necessary to establish the protocol between the machines without manual switching and without the necessity for a duplex circuit. This enables the high speed Group III facsimile machines to be used with simplex radios with the resultant increase in efficiency in reduction in transmission time.

It will be appreciated that the handshaking procedures requiring the exchange of data between the machines are standard protocol procedures utilised on Group III machines and as such do not form part of the invention. It is simply necessary that the apparatus be available to receive and transmit data as determined by the facsimile machine and this is achieved by the monitoring of the state of the facsimile machine that is either in the transmitting mode or the receiving mode and the operation of the switch 90 accordingly.

It will be appreciated that the cable 132 is provided to allow flexibility in connection with different types of machines as each type of machine will require connection to a specific control point that changes state between receive and transmit modes. Such a modification will be provided either before installation of the interface or during production or manufacture of the facsimile machine 10.

The components utilised in the circuits shown in FIG. 2 are listed below although it will, of course, be apparent that other values and types of components may be used.

| Description | Reference Numeral |
|---|---|
| Hammond 585, 600-25K transformer | 104 |
| 2.2 ufd 25 V capacitor | 50, 100, 102, 82, 84, 116, 118, 126 |
| 100 ohm resistor | 28, 80 |
| 15K resistor | 70, 66, 68, 61 |
| 12K resistor | 58 |
| 120 Ω resistor | 56 |
| 27K resistor | 120 |
| 10K linear potentiometer | 124, 52 |
| 5.6K resistor | 40, 42 |
| 23K resistor | 150 |
| 1458 operational amplifier | 57, 60, 62, 32, 34 |
| 74LS00 Quad, dual input NAND gate | 138, 144, 148 |
| 4066 Analog bilateral switch | 90 |
| 4072 quad input OR gate | 140 |
| 7805 5 V monolithic regulator | 48 |
| 2N3904 transistor | 152 |
| 47K resistor | 137, 139 |
| 47K resistor | 141 |

We claim:

1. An interface to connect a data transfer device with a radio transceiver comprising a receiving circuit to receive a data signal in a given form from said transceiver, a transmitting circuit to transmit a data signal in said given form to said transceiver, a data bus to transfer one of said data signals between said device and the respective circuit, switch means to connect one of said circuits with said data bus and control means to control said switch means, said control means being responsive to a signal from said data transfer device, which is indicative of a change in the operational mode thereof to disconnect said one circuit and connect the other of said circuits to said data bus.

2. An interface according to claim 1 wherein said signals are transferred between said data transfer device and said transceiver in serial form.

3. An interface according to claim 2 wherein said control means operates upon said transceiver to condition said transceiver to a transmit mode upon connection of said databus with said transmitting circuit.

4. An interface according to claim 2 wherein said control means is responsive to a change from an inactive to an active condition to connect said databus to said transmitting circuit.

5. An interface according to claim 4 wherein said receiving circuit includes a "push pull" circuit.

6. An interface according to claim 4 including amplifying means in said receiving circuit.

7. An interface according to claim 6 wherein a buffer amplifier is included in said transmitting circuit to isolate said switch means and said transceiver.

8. A data transmission system for transmitting digital data between a pair of facsimile reproduction machines, comprising a pair of radio transceivers, each associated with a respective one of said machines, interface means between each transceiver and respective machine to control operation of both and to transfer data signals in a give form there between, each of said interface means being operable in a receive mode to receive a data signal in said given form from said transceiver for said respective machine and in a transmit mode to transmit a data signal in said given form to said transceiver from said respective machine and having switch means responsive to a change in the mode of operation of said respective machine to cause a corresponding change in the mode of operation of said interface means.

9. A data transmission system according to claim 8 wherein said data signals are transferred a serial form.

10. A data transmission system according to claim 9 wherein said switch means is operable upon a respective transceiver to change the mode of operation of said transceiver upon a change in operation of said respective one of said machines.

* * * * *